March 13, 1934.  W. S. CALCOTT ET AL  1,950,429
PROCESS AND APPARATUS FOR TREATING ACETYLENE DERIVATIVES
Filed July 12, 1929
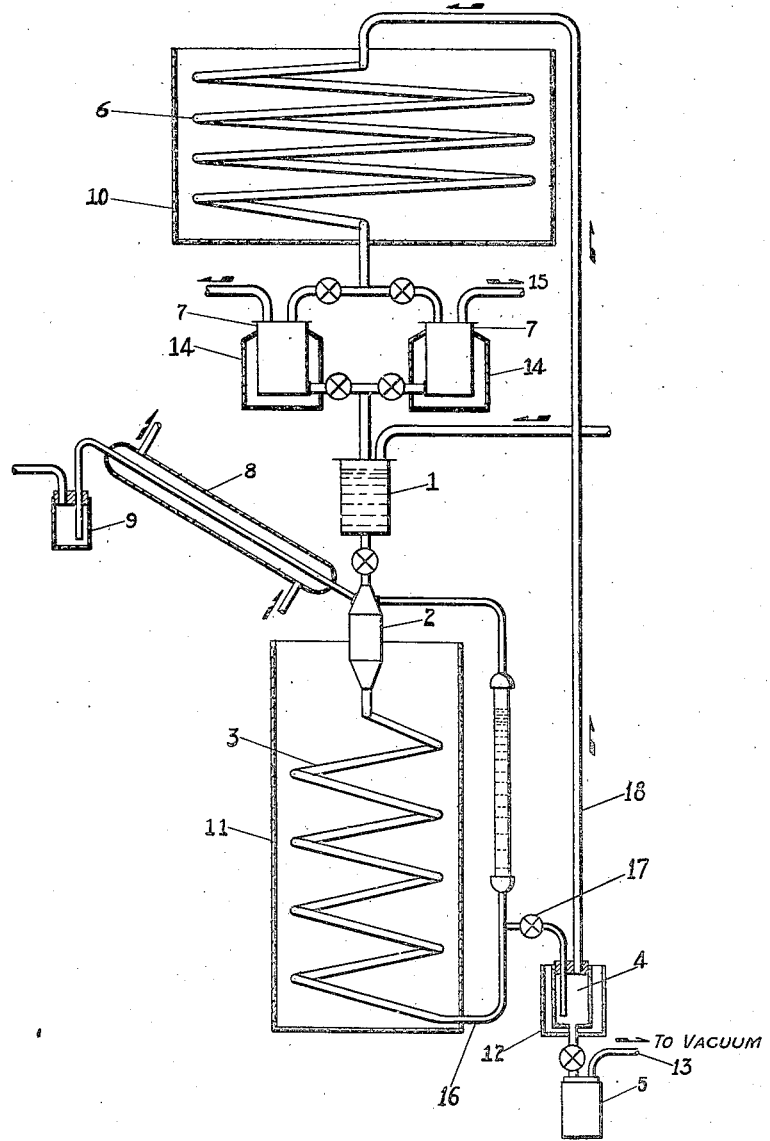
W.S.Calcott and F.B.Downing, INVENTORS
BY
*Lee R. Grabill Jr.*
ATTORNEY Patented Mar. 13, 1934

1,950,429

UNITED STATES PATENT OFFICE 1,950,429

PROCESS AND APPARATUS FOR TREATING ACETYLENE DERIVATIVES

William S. Calcott, Penns Grove, and Frederick B. Downing, Carneys Point, N. J., assignors to E. I. du Pont de Nemours & Company, Wilmington, Del., a corporation of Delaware Application July 12, 1929, Serial No. 377,662

14 Claims. (Cl. 260—2)

This invention relates to improvements in the methods of producing polymers of divinylacetylene and associated compounds and to apparatus therefor. More particularly, it relates to a continuous process of producing liquid mixtures of polymers of divinylacetylene and associated compounds, freed from unpolymerized divinylacetylene.

It is known that by passing acetylene into a mixture of ammonium chloride, water, cuprous chloride and copper powder, unsaturated non-benzenoid hydrocarbons of higher molecular weight are formed and may be obtained by distilling them from the mixture. This process is disclosed in a copending application of Nieuwland Serial No. 305,866 filed September 13, 1928 as a continuation in part of his application Serial No. 153,210, filed December 7, 1926. The water driven over during the distillation process is returned to the catalyst mixture which is then ready for retreatment with acetylene. The major product is a low boiling (80 to 85° C.), highly unsaturated oil called divinylacetylene and having the empirical formular $C_6H_6$. Small amounts of higher and lower boiling unsaturated oils are also obtained which result from the polymerization or further reaction of the low boiling product. Among these unsaturated oils may be mentioned a polymer having most probably the empirical formula $C_8H_8$ and, therefore, a tetramer of acetylene, and a polymer having the formula $C_4H_4$. This polymer has been identified as monovinylacetylene.

It is also known that divinylacetylene and its associated compounds polymerize when heated under non-oxidizing conditions or in the presence of an antioxidant (see the copending application of the present inventors Serial No. 288,528 filed June 26, 1928) giving mixtures of unchanged divinylacetylene and liquid and resinous polymers of higher molecular weight. By distilling off the unchanged divinylacetylene on a water bath under reduced pressure, a residue comprising a mixture of the polymer modifications may be obtained.

The present invention has an object the production of liquid mixtures of such non-benzenoid polymers of divinylacetylene and its associated compounds. Another object is to produce polymer mixtures freed from appreciable quantities of unchanged divinylacetylene. A further object is the production of the polymers in a continuous manner. Other objects will appear hereinafter.

While the continuous process may be successfully operated in a number of ways, which fall within the scope of our invention, and while the particular type of apparatus employed is of slight importance, for purposes of illustration an arrangement of apparatus suitable for carrying out the process, together with an actual embodiment of the process as carried out therein, are described below.

The single figure of the drawing shows a diagrammatic view of the apparatus.

In the drawing 1 is a charging and supply tank which may be, for example, of nickel or glass and which is provided with a supply inlet and connected with the helical coil 3 of nickel pipe through an expansion valve and the expansion chamber 2. The chamber 2 is provided with a reflux condenser 8 discharging at its upper end into the trap 9. The coil 3 is surrounded with a vessel or a jacket 11 adapted to contain water and provided with any well known type of heating means (not shown). At its lower end the coil is connected through pipe 16 and the valve 17, as shown, to the vessel 4 which is surrounded by a jacket or vessel 12, which is also provided with a suitable heating means (not shown) and is adapted to contain water.

The vessel 4, as shown, connects through a discharge valve at its bottom to the receiver 5 which is provided at its top with a vapor outlet 13 connected to a source of reduced pressure (not shown). A connection 18 leads upwardly from the upper part of the vessel 4 to the condenser coil 6 contained within the brine jacket 10. At its lower end the condenser coil leads, as shown, through a valved two-way connection to the receivers 7 which are provided with cooling jackets 14 and vapor outlets 15. A valved outlet leads from the bottom of each of the chambers 7 into the supply tank 1.

The process is carried out in the following manner. The water bath 11 is heated to a uniform temperature of 85–87° C. and divinylacetylene mixed with about 5% of xylene or solvent naphtha is allowed to flow into the coil 3 at a rate which will fill the coil in a period of 6½ to 7 hours. Meanwhile the still 4 is prepared for operation by heating the water bath to a temperature of from 85–100° C. and applying suction to the polymer receiver 5 and the vapor outlets of the receivers 7. After the coil 3 is filled the raw polymer mixture is allowed to flow from the bottom of the coil 3 through valve 17 into the heated still 4. Volatile components escaping in the early stages are collected in the reflux condenser 8 and returned to the system. The liquid level in the coil is maintained by feeding into the upper end of the coil fresh mixture from the supply tank 1 in an amount equivalent to the liquid drawn off below. The valve 17 is adjusted so that the operation is allowed to proceed at such a rate that the contents of the polymerizing coil are changed every 6½ to 7 hours. In the vacuum still 4, operating at a pressure of 50 to 100 mm. of mercury or less, the volatile unreacted divinylacetylene and part of the added solvent are rapidly removed.

The distillation may be regulated by the degree of reduced pressure used, the temperature and the nature of the added solvent, to yield a product containing but a fraction of a per cent of the original divinylacetylene and from less than 1% up to 10–15% of the added solvent. The still residue, which comprises the liquid mixture of polymers and remaining solvent, is drawn off, either continuously or at intervals, into the receiver 5. The vapors arising from the vessel 4 contain the unpolymerized divinylacetylene and are condensed in the coil 6.

The condensed unreacted mixture is discharged alternatively into the receivers 7 and, from the receiver 7 not open to the condenser, is returned to the supply tank from whence the operation is repeated. The required amounts of raw mixture are continuously introduced into the supply tank 1 while the content of added solvent is regulated to maintain the proportion of solvent substantially constant. Under normal conditions of operation, the heated mixture issuing from the polymerizing coil before evaporation will contain 20–30% of the polymerized product which will be separated in and may be continuously withdrawn from the still.

We have found, by carrying out the polymerization by thus heating the divinylacetylene as it slowly flows downward through a pipe or coil, that a raw polymer mixture may be continuously withdrawn from the coil without danger of gelling the mixture, an objectionable phenomenon which is often encountered in conducting such reactions and which generally results in loss of the product through difficulties in handling and treatment.

As the reaction proceeds in the coil, the boiling point and density of the mixture increase while the heat given off in the reaction decreases so that the coil contents tend to quietly progress through the tube with relatively little tendency to counter-flow and mixture of the constituents. This method of polymerization also permits the provision, if desired, of two or more jackets around the coil heated to successively increasing temperatures as the reaction proceeds until finally a reaction temperature of 100° C. is attained. Even higher temperatures can be used, but each step above 100° C. increases the hazard of gellation and decomposition in the coil and requires increasing care in adjusting the rate of flow through the various reaction zones. Lower temperatures may also be employed. The production capacity of the equipment, however, at high temperatures is greatly increased without increasing the volume of divinyl in the polymerizer, since advantage is taken of the high positive temperature coefficient of the polymerization reaction.

Although the process may be carried out without solvents, the introduction into the divinyl acetylene mixture of up to 10% of a solvent boiling higher than divinylacetylene (80–85° C.) makes it possible to carry out the process with numerous variations, the effect of which will depend upon the amount, boiling point and nature of the added solvent. An increase in the amount of solvent slows up the reaction, however, as an effect of dilution, so that the addition of more than 10%, while possible, is not recommended.

Such solvents as, for example, toluene, xylene ethyl benzene, solvent naphtha and the higher boiling solvent naphtha known as "high flash" may be used. For example, the addition of 2% of xylene increases the boiling point of the mixture thus lessening any tendency toward bumping in the various polymerization temperature zones; the added solvent also exercises a solvent action on the polymer and decreases the danger of gellation in the coil, while it does not markedly decrease the polymerization rate of the divinylacetylene and associated compounds.

In the distillation step, the added solvent, by its higher boiling point, assists the vaporization and removal of the unchanged divinylacetylene and, at the same time, dilutes the mixture refluxing on the still walls so that further reaction of divinyl in the still is retarded and the polymer is kept washed down, gelling or hardening of the polymer in the still is thus avoided. It is obvious that the higher the boiling point of the added solvent the more it tends to remain in the final polymer product but a more rapid separation of unchanged divinyl is obtained and less solvent need be added to the crude material.

The operating conditons such as temperature of polymerization, time cycle through the polymerizer, amount and type of solvent added, and pressure control of the flash distillation under reduced pressure may all be varied somewhat by those skilled in the art to obtain products of varying degrees of polymerization and solvent content. In general, however, the resulting products are oily liquids which upon exposure to air further polymerize to yield a tough chemically resistant product. They are thus suitable for use in coating compositions.

As many apparently widely different embodiments of this invention may be made without departing from the spirit and scope thereof, it is to be understood that we do not limit ourselves to the specific embodiment thereof except as defined in the appended claims.

We claim:

1. A process of polymerizing a liquid non-benzenoid acetylene polymer which comprises heating a stream of the flowing polymer.

2. A process of polymerizing a liquid non-benzenoid acetylene polymer which comprises heating a stream of the flowing polymer and separating the polymerized liquid from the unpolymerized liquid.

3. A process of polymerizing a liquid non-benzenoid acetylene polymer which comprises heating a stream of the flowing polymer from 85 to 100° C. and separating the polymerized liquid from the unpolymerized liquid.

4. A process of polymerizing a liquid non-benzenoid acetylene polymer which comprises heating a stream of the flowing polymer in admixture with a higher boiling solvent.

5. The process of claim 1 wherein the stream is heated to successively increasing temperatures.

6. A cyclic process of polymerizing a liquid non-benzenoid acetylene polymer which comprises passing a continuous stream of the polymer through a heated zone, continuously separating the resulting polymerized liquid from the unpolymerized liquid and returning the latter to the stream.

7. A cyclic process of polymerizing a liquid non-benzenoid acetylene polymer which comprises passing a continuous stream of the polymer through a heated zone, continuously separating the resulting polymerized liquid from the unpolymerized liquid by distillation, withdrawing the polymerized residue, condensing the vaporized unpolymerized liquid and returning the condensate to the stream undergoing polymerization.

8. A cyclic process of polymerizing a liquid non-benzenoid acetylene polymer which comprises passing a continuous stream of the polymer through a zone heated to a temperature of 85–100° C., continuously separating the resulting polymerized liquid from the unpolymerized liquid by distillation, withdrawing the polymerized residue, condensing the vaporized unpolymerized liquid and returning the condensate to the stream undergoing polymerization.

9. A cyclic process of polymerizing a liquid non-benzenoid acetylene polymer which comprises passing a continuous stream of a mixture of the polymer and a higher boiling solvent through a zone heated to a temperature of 85–87° C., continuously evaporating the unpolymerized liquid from the polymerized product under reduced pressure and at a temperature of 85–100° C., continuously withdrawing the polymerized product, continuously condensing the vaporized unpolymerized liquid and continuously returning the condensate to the stream undergoing polymerization.

10. The process set forth in claim 8 wherein a given portion of a stream of liquid acetylene polymer containing from about 2% to 10% of added solvent is passed through the heated zone in from 6½ to 7 hours.

11. The process set forth in claim 8 wherein the temperature of the zone increases in successive stages from about 85° C. to about 100° C.

12. A process of polymerizing an unsaturated hydrocarbon of the group consisting of monovinyl and divinyl acetylene which comprises heating a stream of the flowing hydrocarbon.

13. A process of polymerizing an unsaturated hydrocarbon of the group consisting of monovinyl and divinyl acetylene which comprises maintaining a stream of the flowing hydrocarbon at a temperature of from 85 to 100° C. and separating the polymerized liquid from the unpolymerized liquid.

14. A cyclic process of polymerizing a liquid acetylene polymer of the group consisting of monovinyl and divinyl acetylene which comprises passing a continuous stream of the polymer through a heated zone, continuously separating the resulting polymerized liquid from the unpolymerized liquid and returning the latter to said stream.

WILLIAM S. CALCOTT.
FREDERICK B. DOWNING.